Patented Feb. 6, 1951

2,540,736

UNITED STATES PATENT OFFICE 2,540,736

ADDITION PRODUCTS OF ACETYLENE AND THEIR PREPARATION

George H. Kalb, Landenberg, Pa., and John C. Sauer, Wilmington, Del., assignors to E. I. du Pont de Nemours & Company, Wilmington, Del., a corporation of Delaware No Drawing. Application January 24, 1949, Serial No. 72,543

13 Claims. (Cl. 260—465.9)

This invention relates to new chemical processes and to new chemical products. More particularly this invention relates to new chemical reactions involving acetylene and to new chemical compositions which are addition products of acetylene.

It is an object of this invention to provide new chemical products and methods for their preparation. A further object is to provide new chemical processes involving acetylene. A still further object is to provide new addition products of acetylene. Another object is to provide a chemical process for reacting acetylene directly with certain other chemical compounds. Other objects will appear hereinafter.

The objects of this invention are accomplished by providing new products from acetylene and compounds of the class of vinylidene and vinylene compounds containing an acyclic carbon atom attached directly by a single bond to the vinylidene or vinylene radical, said acyclic carbon atom having attached thereto by a plural bond an element of atomic number 7 to 8 inclusive. The new compounds of this invention are obtained by reacting acetylene with either a vinylidene or vinylene compound of the above defined structure in the presence of a complex of a nickel compound and either a triaryl or trialkoxy compound of an element in the trivalent state from sub-group B, group V, of the periodic table.

The temperature at which the process of this invention is operated may vary from 50° to 150° C. The best operating conditions from the standpoint of yield of desired product and speed of reaction are found, however, in the range of 60° to 100° C., and this therefore constitutes the range most commonly used.

Pressure is not a critical variable and the process may be operated at atmospheric pressure or at pressures which may be above or below atmospheric. For convenience and simplicity of equipment requirements it is preferred to operate at pressures in the range of 50 to 300 pounds/in.²

The time of reaction varies with the particular reactants involved in the reaction, the temperature employed, the amount and type of catalyst used, etc. The reaction is assumed to be complete when there is no further observed pressure drop.

In actual practice a reactor is charged with the vinylidene or vinylene compound and catalyst, swept with oxygen-free nitrogen, and pressured with the acetylene. The charged reactor is then closed, the reaction mixture heated to between 50° and 150° C. and the pressure within the reactor is maintained within the range of 40 to 500 pounds/in.² by periodic additions of acetylene. After reaction is complete, as evidenced by cessation of pressure drop, the contents of the reactor are discharged and the product isolated by means well known to those skilled in the art, e. g., distillation, etc.

The examples which follow are submitted to illustrate and not to limit this invention. Unless otherwise stated parts are by weight.

Example I

A stainless steel reactor was charged with 100 parts of acrylonitrile, 0.8 part triphenylphosphine and 2.0 parts of nickel carbonyl. The vessel was flushed with nitrogen, pressured to 50 lbs./sq. in. with acetylene and heated to 50° C. When this temperature was reached, 220 lbs./sq. in. acetylene pressure was applied. The vessel was repressured with acetylene every one-half hour for approximately 16 hours. The vessel was cooled and its contents removed. The gain in weight amounted to 88 parts. From the reaction mixture there was isolated a compound corresponding in molecular formula to $C_7H_7N$ boiling at 41° to 48° C. at 0.50 to 0.70 mm. pressure, and $n_D^{25}$ 1.5519 to 1.5875.

Anal.: Calcd. for $C_7H_7N$: C, 79.97; H, 6.71; N, 13.32.
Found: C, 80.3; H, 6.4; N, 12.6.

The compound $C_7H_7N$ was characterized as 2,4,6-heptatrienonitrile,

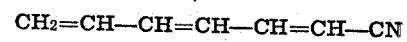

by hydrogenation to oenanthonitrile (1-cyanohexane), formation of a mono-adduct with maleic anhydride, ozonolysis to hydrogen cyanide, formic and oxalic acids, and infra-red and ultraviolet absorption measurements. The wide spread in the boiling point and refractive index values is due to the fact that the structure, $CH_2=CH—CH=CH—CH=CH—CN$ is capable of existence in four geometric isomeric forms and the product isolated was therefore a mixture of these geometric isomers.

In addition to the 2,4,6-heptatrienonitrile there was formed a small amount of a product corresponding in molecular formula to $C_{10}H_{10}N_2$ and boiling at 110° C. to 115° C. at 3 mm. pressure.

Example II

A stainless steel pressure vessel was charged with 100 parts of acrylonitrile, 1 part of triphenylphosphine and 2 parts of nickel carbonyl. The vessel was closed and flushed three times with nitrogen and once with acetylene. Fifty lbs./sq. in. acetylene pressure was applied and the reactor heated to 75° C. When this temperature was reached, acetylene was added to bring the total pressure to 200 to 250 lbs./sq. in. The vessel was repressured every one-half hour until acetylene absorption ceased. After a preliminary distillation to remove unchanged starting material, the crude reaction product was subjected to precision fractionation. There was obtained 9.7 parts of purified material characterized as in Example I as $C_7H_7N$, boiling at 39.6–44.3° C./0.25–0.45 mm. Hg pressure. This material boiled at 215° C. (micro method) at ordinary pressures and had a density of $$0.9089 \text{ at } \frac{25}{4}, \; n_D^{25} = 1.5540$$

Anal.: Calcd. for $C_7H_7N$: C, 79.97; H, 6.71; N, 13.32; MW 105.1; MR 32.88.
Found: C, 80.12; H, 6.66; N, 13.18; MW (ebullioscopic in benzene 106); MR 37.08.

Example III

To 100 parts methyl acrylate (containing 0.25 part of hydroquinone) in a stainless steel pressure vessel was added 1 part of triphenylphosphine and 2 parts of nickel carbonyl. The vessel was flushed with nitrogen, pressured to approximately 50 lbs./sq. in. with acetylene and heated to 70° C. When this temperature was attained, sufficient acetylene was added so that the total pressure amounted to 200 to 220 lbs./sq. in. Acetylene was added at one-half hour intervals to maintain pressure. After 14 hours, the vessel was cooled, its content removed and the material subjected to distillation under reduced pressure. There was obtained 74 parts of a clear, highly refractive liquid boiling at 55–80° C./1–2 mm. pressure. Redistillation yielded 29 parts of highly purified ester boiling at 39.4–38.0° C./0.30–25 mm. Hg pressure. The refractive index was 1.5503 at 25° C.

Anal.: Calcd. for $C_8H_{10}O_2$: C, 69.54; H, 7.30.
Found: C, 69.99; H, 7.75.

The product corresponding in molecular formula to $C_8H_{10}O_2$ was characterized as methyl-2,4,6-heptatrienoate,

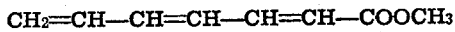

$$CH_2=CH-CH=CH-CH=CH-COOCH_3$$

by hydrogenation to methyl heptanoate and infra-red and ultra-violet absorption measurements.

In addition to the product of molecular formula $C_8H_{10}O_2$ a small amount of product corresponding to $C_{12}H_{16}O_4$, boiling at 113° to 115° C. at 0.5 mm. pressure was obtained. The example which follows illustrates the isolation of this material.

A solution of 3 parts of triphenylphosphine and 6 parts of nickel carbonyl in 300 parts of methyl acrylate was treated with acetylene under 200 to 225 pounds per sq. in. pressure, until absorption of acetylene ceased at temperatures of 70° to 85° C. After reaction was complete, the reactor was cooled, discharged, and the contents filtered. Distillation of the filtrate yielded in addition to product corresponding in molecular formula to $C_8H_{10}O_2$, 43.4 parts of a higher boiling material. Refractionation of the higher boiling material gave 24 parts of a product boiling at 113° to 115° C. at 0.5 mm. pressure. The density was 1.123. Analysis of the product showed it to contain 64.13%, 64.24% carbon and 7.12%; 7.31% hydrogen. The calculated values for $C_{12}H_{16}O_4$ are 64.26% carbon and 7.19% hydrogen.

Example IV

A stainless steel reactor was charged in an atmosphere of $N_2$ with 81 parts of acrylonitrile, 1 part of triphenylphosphine and 1 part of nickel cyanide. The vessel was cooled in Dry Ice/acetone, evacuated and pressured to 100 lbs./sq. in. with acetylene. The reactor was heated to 65° C. and repressured to 155 lbs./sq. in. The vessel was repressured with acetylene as required while maintaining a temperature range of 65–71° C. and a pressure range of 160–220 lbs./sq. in. Upon distillation of the crude reaction product, there were recovered 52 parts of acrylonitrile distilling at 73–77° C. and 50 parts of the liquid nitrile distilling at 58–59° C./1 mm. and having the molecular formula $C_7H_7N$. This product was characterized as 2,4,6-heptatrienonitrile as described in Example I. The sample of nitrile had a refractive index of 1.5858.

Example V

Under the conditions described above, a mixture containing 81 parts of acrylonitrile, 1.7 parts of triethylphosphite and 1.7 parts of nickel carbonyl was reacted with acetylene during 8 hours at 60–65° C. and pressure varying from 150–250 lbs./sq. in. There was recovered 39 parts of acrylonitrile, and 53 parts of a nitrile distilling at 56–58° C./1 mm., $n_D^{25}$, 1.5743, characterized as described in Example I as 2,4,6-heptatrienonitrile.

Examples of vinylidene compounds usefully employable in the practice of this invention are acrylonitrile, acrylic acid esters, for example, methyl and ethyl acrylates, halogen substituted acrylic acids, their amides and esters, methyl vinyl ketone, methylenecyanoacetic acid esters, itaconic acid esters, methylenemalonic ester, acrolein, methacrolein, and the like.

Examples of vinylene compounds usefully employable in the practice of this invention are maleic anhydride, maleic and fumaric acid esters, e. g., methyl and ethyl maleates and fumarates, maleonitrile, fumaronitrile, maleiamide, fumaramide, crotonic esters such as ethyl and propyl crotonates, cinnamic esters such as methyl and butyl cinnamates, etc.

Specially useful compounds because of their ease of reactivity and good yields of desired products are those vinylidene and vinylene compounds of the general formula

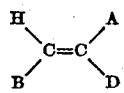

where A is selected from the group of nitrile, acyl, carboxyl, carboalkoxy, and carbamyl radicals and B and D are selected from the class of hydrogen and alkyl, aryl, nitrile, acyl, carboxyl, carbamyl, and carboalkoxy radicals. Preferred carboalkoxy, acyl and aryl radicals contain up to 10 carbon atoms. Examples of such compounds are acrylonitrile, acrylic and methacrylic acids, acrylic acid esters, e. g., methyl, ethyl and decyl acrylates, etc., acrylamide, methyl vinyl ketone, acrolein, methacrolein, crotonic esters such as methyl crotonate, crotonaldehyde, cinnamic acid esters, e. g., methyl and ethyl cinnamates, etc., methyl-alpha-phenylacrylate, maleonitrile, maleic esters, fumaronitrile, fumaramide, ethyl ethylene tricarboxylate, etc.

The products obtained by reacting acetylene with a compound of the general formula

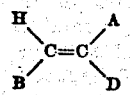

correspond in structure to

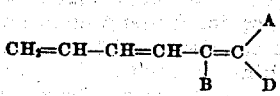

wherein A is from the class consisting of acyl, carboxyl, carbamyl, nitrile and carboalkoxy groups, and B and D are from the class consisting of hydrogen and alkyl, aryl, acyl, carboxyl, carbamyl, nitrile and carboalkoxy groups. When acetylene is reacted with a vinylidene compound of the general formula

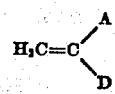

the products corresponding in structure to

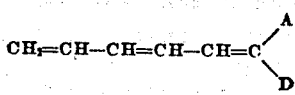

where A and D are defined as aforesaid. When acetylene is reacted with a vinylene compound of the general formula B—CH=CH—A the products correspond in structure to

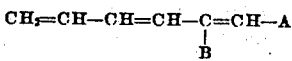

where A and B are defined as aforesaid. Preferred products are those obtained by reacting acetylene with a vinylidene compound of the general formula $H_2C=CH-A$ and correspond in structure to $CH_2=CH-CH=CH-CH=CH-A$ where A is defined as aforesaid. Specific examples of such new compounds are: propyl-2,4,6-heptatrienoate, octyl-2,4,6-heptatrienoate, decyl-2,4,6-heptatrienoate, 3,5,7-octatriene-2-one, 2,4,6-heptatrienoic acid, 2,4,6-heptatrienoic amide, 3-methyl-2,4,6-heptatrienenitrile, methyl 3-methyl-2,4,6-heptatrienoate, 4 - methyl-3,5,7-octatriene-2-one, 3-methyl-2,4,6-heptatrienoic acid, 3-methyl-2,4,6-heptatrienoic amide, 2,3-dimethyl-2,4,6-heptatrienenitrile, methyl 2,3-dimethylheptatrienoate, 3,4 - dimethyl - 3,5,7-octatriene-2-one, 2,3 - dimethyl- 2,4,6 - heptatrienoic acid, 2,3-dimethyl-2,4,6-heptatrienoic amide, and the like.

The catalysts used in the practice of this invention are complexes formed from a nickel compound and either an aryl or alkoxy derivative of an element from sub-group B, group V of the periodic table, in the trivalent state. Specific examples of nickel compounds are nickel carbonyl, nickel cyanide, nickel oxide, nickel hydroxide, nickel ethylacetoacetate, nickel acetonylacetate, nickel carbonate, nickel dimethylglyoxime, nickel chloride, nickel stearate, nickel oleate and the like. The preferred nickel compounds are nickel carbonyl and nickel cyanide. These are nickel-carbon compounds in which the valences of the carbon not satisfied by nickel are satisfied by atoms of atomic number 7 to 8 inclusive. Examples of aryl and alkoxy compounds of trivalent elements from sub-group B, group V, of the periodic table are triphenylamine, triphenylphosphine, triphenylarsine, triphenylstibine, tritolylphosphine, tri-n-butylphosphite, trixylylarsine, trimethylphosphite, triethylphosphite, triamylphosphite, triphenylbismuthine and the like. These complexes may be made by reacting one mole of the nickel compound with one or more moles of the aryl or alkoxy derivative of the element from sub-group B, group V of the periodic table in the trivalent state.

The amount of catalyst employed is at least 0.001 mole of the nickel compound per mole of the vinylidene or vinylene compound and at least 0.001 mole of the aryl or alkoxy derivative of the element from sub-group B, group V of the periodic table per mole of the vinylidene or vinylene compound. The complex may be preformed and added as such in catalytic amounts to the reaction mixture or may be made in situ by adding the nickel compound and aryl or alkoxy derivative of the element of sub-group B, group V of the periodic table to the reaction mixture.

The products of this invention are mixtures of geometric isomers and the relative proportion of a given isomer in a given mixture depends upon the particular conditions employed in preparation. The properties of these isomer mixtures vary depending upon the relative amounts of the various isomers present.

The products of this invention are useful as intermediates for the preparation of acids, amines and the like which find application as solvents, and as pharmaceutical, insecticidal and dye intermediates, and as drying oil intermediates. Polymers useful as coating compositions and plastics can be made by polymerization by the usual vinyl polymerization technique.

As many apparently widely different embodiments of this invention may be made without departing from the spirit and scope thereof it is to be understood that this invention is not limited to the specific embodiments thereof except as defined in the appended claims.

We claim:

1. An aliphatic conjugated triene compound of the general formula $$CH_2=CH-CH=CH-CH=CH-A$$

wherein A is selected from the class consisting of carboxyl, carbamyl, nitrile and carboalkoxy groups.

2. The chemical compound 2,4,6-heptatrienonitrile.

3. An alkyl 2,4,6-heptatrienoate.

4. The chemical compound, methyl 2,4,6-heptatrienoate.

5. A process which comprises heating in the presence of a catalyst comprising a complex of a nickel compound and a compound from the group consisting of aryl and alkoxy compounds of a trivalent element from sub-group B, group V of the periodic table, a mixture of acetylene and a compound selected from the class consisting of vinylidene and vinylene compounds containing an acyclic carbon atom attached directly to the respective vinylidene and vinylene radicals by a single bond, said acyclic carbon atom having attached thereto by a plural bond an element of atomic number 7 to 8 inclusive, and isolating from the reaction mixture an aliphatic conjugated triene compound.

6. A process which comprises heating in the presence of a catalyst comprising a complex of a nickel compound and a compound from the group consisting of aryl and alkoxy compounds of a trivalent element from sub-group B, group V of the periodic table, a mixture of acetylene and a vinylidene compound containing an acyclic carbon atom attached directly to the vinylidene radical by a single bond, said acyclic carbon atom having attached thereto by a plural bond an element of atomic number 7 to 8 inclusive, and isolating from the reaction mixture an aliphatic conjugated triene compound.

7. A process as set forth in claim 5 in which said complex is formed in situ by adding to the reaction mixture the nickel compound and the compound from the group consisting of aryl and alkoxy compounds of a trivalent element from sub-group B, group V of the periodic table.

8. A process which comprises heating in the presence of a catalyst comprising a complex of nickel carbonyl and triphenylphosphine, a mixture of acetylene and a vinylene compound containing an acyclic carbon atom attached directly to the vinylene radical by a single bond, said acyclic carbon atom having attached thereto by a plural bond an element of atomic number 7 to 8 inclusive, and isolating from the reaction mixture an aliphatic conjugated triene compound.

9. A process which comprises heating at a temperature of 50° to 150° C., under a pressure of 40 to 500 lbs./sq. in., and in the presence of a catalyst comprising a complex of nickel carbonyl and triphenylphosphine, a mixture of acetylene and acrylonitrile, and isolating from the reaction mixture 2,4,6-heptatrienonitrile.

10. A process which comprises heating at a temperature of 50° to 150° C., under a pressure of 40 to 500 lbs./sq. in., and in the presence of a catalyst comprising a complex of nickel carbonyl and triphenylphosphine, a mixture of acetylene and an alkyl acrylate, and isolating from the reaction mixture an alkyl 2,4,6-heptatrienoate.

11. A process which comprises heating at a temperature of 50° to 150° C. under a pressure of 40 to 500 lbs./sq. in., in the presence of a catalyst comprising a complex of nickel carbonyl and triphenylphosphine, a mixture of acetylene and methyl acrylate, and isolating from the reaction mixture methyl 2,4,6-heptatrienoate.

12. A process which comprises heating at a temperature of 50° to 150° C. under a pressure of 40 to 500 lbs./sq. in., in the presence of a catalyst comprising a complex of nickel cyanide and triphenylphosphine, a mixture of acetylene and acrylonitrile, and isolating from the reaction mixture 2,4,6-heptatrienonitrile.

13. A process which comprises heating at a temperature of 50° to 150° C. under a pressure of 40 to 500 lbs./sq. in., and in the presence of a catalyst comprising a complex of nickel carbonyl and triethylphosphite, a mixture of acetylene and acrylonitrile, and isolating from the reaction mixture 2,4,6-heptatrienonitrile.

GEORGE H. KALB.
JOHN C. SAUER.

REFERENCES CITED

The following references are of record in the file of this patent:

Kuhn et al.: Chem. Abstracts, vol. 25, p. 683 (1931).

Kethur et al.: Chem. Abstracts, vol. 30, pp. 8201, 8202 (1936).

Peck et al.: Interview with Dr. W. J. Reppe, Fiat Final Report No. 273, Office of Mil. Govt., pp. 9–11 (Oct. 2, 1945).